US008319612B2

(12) United States Patent
Borcherding (10) Patent No.: US 8,319,612 B2
(45) Date of Patent: *Nov. 27, 2012

(54) TRANSPONDER DETECTOR FOR AN RFID SYSTEM GENERATING A PROGRESSION OF DETECTION SIGNALS (75) Inventor: Eric J. Borcherding, Westminster, CO (US)

(73) Assignee: Assa Abloy AB (SE)

( * ) Notice: Subject to any disclaimer, the term of this patent is extended or adjusted under 35 U.S.C. 154(b) by 0 days.

This patent is subject to a terminal disclaimer.

(21) Appl. No.: 12/822,397

(22) Filed: Jun. 24, 2010

(65) Prior Publication Data

US 2010/0259390 A1    Oct. 14, 2010

Related U.S. Application Data (63) Continuation of application No. 11/396,291, filed on Mar. 31, 2006.

(51) Int. Cl.
*H04Q 5/22* (2006.01)

(52) U.S. Cl. .................................... 340/10.34

(58) Field of Classification Search ........... 340/10.1, 340/10.3, 10.31, 10.32, 10.33, 10.34, 10.4
See application file for complete search history.

(56) References Cited

U.S. PATENT DOCUMENTS

| | | | |
|---|---|---|---|
| 3,859,624 A | 1/1975 | Kriofsky |
| 4,471,343 A | 9/1984 | Lemelson |
| 4,525,686 A | 6/1985 | Yokoya |
| 4,730,188 A | 3/1988 | Milheiser |
| 4,752,776 A | 6/1988 | Katzenstein |
| 5,347,263 A | 9/1994 | Carroll et al. |
| 5,523,746 A | 6/1996 | Gallagher |
| 5,541,574 A | 7/1996 | Lowe et al. |
| 5,973,611 A | 10/1999 | Kulha et al. |

(Continued)

FOREIGN PATENT DOCUMENTS

EP    0783158    7/1997

(Continued)

OTHER PUBLICATIONS

European Search Report for European Application No. 07251386.4, mailed Mar. 6, 2008.
Examination Report for European Application No. 07251386.4, mailed Nov. 11, 2008.
Written Opinion for European Application No. 07251386.4, mailed Mar. 6, 2008.

(Continued)

*Primary Examiner* — Brian Zimmerman
*Assistant Examiner* — Yong Hang Jiang
(74) *Attorney, Agent, or Firm* — Sheridan Ross P.C.

(57) ABSTRACT

A transponder detector is provided with capabilities for detecting the presence and type of a transponder in its read range while operating at low power. The transponder detector includes an antenna assembly and a detection signal generator circuit coupled to the antenna assembly. The detection signal generator circuit is capable of generating a progression of detection signals on the antenna assembly across a range of frequencies. The transponder detector further includes a response signal receiver circuit coupled to the antenna assembly to receive a progression of response signals from the antenna assembly resulting from the progression of detection signals. A controller is coupled to the response signal receiver circuit which determines the presence and type of the transponder based on an evaluation of a transponder detection parameter in the progression of response signals.

16 Claims, 5 Drawing Sheets

U.S. PATENT DOCUMENTS

| | | | |
|---|---|---|---|
| 6,097,301 A * | 8/2000 | Tuttle | 340/693.9 |
| 6,340,932 B1 | 1/2002 | Rodgers | |
| 6,476,708 B1 | 11/2002 | Johnson | |
| 6,617,962 B1 | 9/2003 | Horwitz et al. | |
| 6,650,227 B1 | 11/2003 | Bradin | |
| 6,905,074 B2 | 6/2005 | Charrat | |
| 7,046,121 B2 | 5/2006 | Wuidart | |
| 7,180,403 B2 | 2/2007 | Quan | |
| 7,196,613 B2 | 3/2007 | Horwitz et al. | |
| 7,245,222 B2 | 7/2007 | Bierach | |
| 7,439,860 B2 | 10/2008 | Andresky | |
| 7,439,862 B2 | 10/2008 | Quan | |
| 7,539,465 B2 | 5/2009 | Quan | |
| 2002/0061738 A1 * | 5/2002 | Simmons et al. | 455/234.1 |
| 2003/0169169 A1 | 9/2003 | Wuidart et al. | |
| 2005/0024198 A1 | 2/2005 | Ward | |
| 2005/0125093 A1 | 6/2005 | Kikuchi et al. | |
| 2005/0225437 A1 | 10/2005 | Shiotsu et al. | |
| 2006/0238301 A1 | 10/2006 | Wu et al. | |
| 2007/0229273 A1 | 10/2007 | Hoemann et al. | |
| 2007/0236336 A1 | 10/2007 | Borcherding | |
| 2009/0051491 A1 | 2/2009 | Lu et al. | |
| 2009/0251291 A1 | 10/2009 | Borcherding | |

FOREIGN PATENT DOCUMENTS

| | | |
|---|---|---|
| EP | 0899677 | 3/1999 |
| EP | 1160583 | 12/2001 |
| EP | 1394720 | 3/2004 |
| EP | 1605391 | 12/2005 |
| EP | 1837800 | 9/2007 |
| EP | 1840790 | 10/2007 |
| GB | 2237427 | 5/1991 |
| GB | 2278631 | 12/1994 |
| WO | WO 98/01837 | 1/1998 |
| WO | WO 00/42585 | 7/2000 |

OTHER PUBLICATIONS

Official Communication for European Patent Application No. 07251385.6, dated May 7, 2009.
Extended European Search Report issued for European Patent Application No. 07251385.6, dated Jul. 10, 2007.
Examination Report for European Application No. 07251386.4, mailed Nov. 7, 2008.
Offical Communication for European Patent Application No. 07251385.6, dated Oct. 20, 2009.
Examiner's First Report for Australian Patent Application No. 2007201297, dated May 17, 2010.
Office Action for U.S. Appl. No. 11/396,290, mailed Apr. 1, 2009.
Office Action for U.S. Appl. No. 11/396,290, mailed Oct. 28, 2009.
Office Action for U.S. Appl. No. 11/396,291, mailed Mar. 24, 2010.
Official Action for European Patent Application No. 07251385.6, dated Mar. 4, 2011 4 pages.
Notice of Acceptance for Australia Patent Application No. 2007201297, dated Mar. 31, 2011 3 pages.
Extended European Search Report for European Patent Application No. EP 09156982, dated Apr. 28, 2011 2 pages.
Official Action for U.S. Appl. No. 11/396,291, mailed Feb. 4, 2011.
Official Action for U.S. Appl. No. 11/396,291, mailed Aug. 25, 2010.
Search Opinion for European Patent Application No. EP 09156982, dated May 9, 2011 6 pages.
Notice of Allowance for U.S. Appl. No. 11/396,291, mailed Jun. 30, 2011 5 pages.
Intention to Grant Patent for European Patent Application No. 09156982.2, dated Apr. 18, 2012 61 pages.

* cited by examiner

TRANSPONDER DETECTOR FOR AN RFID SYSTEM GENERATING A PROGRESSION OF DETECTION SIGNALS

CROSS-REFERENCE TO RELATED APPLICATIONS

This application is a continuation of U.S. patent application Ser. No. 11/396,291, filed Mar. 31, 2006, the entire disclosure of which is hereby incorporated herein by reference.

TECHNICAL FIELD

The present invention relates generally to RFID systems and, more particularly, to the construction and operation of a transponder detector utilized as a stand-alone unit or in association with a reader of an RFID system.

BACKGROUND OF THE INVENTION

Radio frequency identification (RFID) systems typically include at least one reader and a plurality of transponders, which are commonly termed credentials, cards, tags, or the like. Each transponder is an active or passive radio frequency communication device which is directly attached to or embedded in an article to be identified or otherwise characterized by the reader. Alternatively, the transponder is embedded in a portable substrate, such as a card, tag, or the like, carried by a person or an article to be identified or otherwise characterized by the reader.

An active transponder is powered up by its own internal power supply, such as an internal battery, which provides the operating power for the transponder circuitry. In contrast, a passive transponder is dependent on the reader for its power. The passive transponder typically consists of an integrated circuit (IC) chip coupled to a resonant LC circuit which has a capacitor and an inductive antenna in parallel or in series. The reader "excites" or powers up the passive transponder by transmitting excitation signals of a given frequency into the proximal space surrounding the reader. When the transponder resides in the proximal space, its inductive antenna receives the excitation signals which are converted into the operating power for the IC chip of the recipient transponder.

The powered up transponder generates transponder data signals which are in the form of electromagnetic waves embodying information such as identity data or other characterizing data stored in the memory of the IC chip. The transponder data signals are characterized by a specific carrier frequency which generally corresponds to the frequency of the excitation signals. The carrier frequency is inter alia a function of the transponder LC circuit and is often unique to the particular manufacturer of the transponder used to generate the transponder data signal. The transponder manufacturer establishes a desired carrier frequency of transponder data signals by tuning the LC circuit to a resonant frequency which corresponds to the desired carrier frequency.

The resonant frequency (and correspondingly the carrier frequency) of commercially-available passive transponders conventionally employed in RFID applications generally fall within either a low frequency range or a high frequency range. The low frequency range extends about a nominal low frequency of 125 kHz and is typically within a range of 100 to 150 kHz. In contrast, the high frequency range extends about a nominal high frequency of 13.56 MHz. Low frequency transponders are commonly termed proximity credentials and high frequency transponders are commonly termed smart credentials. It is apparent from the above that there can be significant variability in transponder frequencies even among different types of low frequency transponders or among different types of high frequency transponders.

In any case, the transponder data signals are transmitted via the transponder antenna into the proximal space surrounding the reader in which the transponder resides. The reader contains its own LC circuit having a capacitor and an inductive antenna which is tuned to essentially the same resonant frequency as the transponder LC circuit, thereby rendering the reader and transponder compatible. The reader LC circuit receives the transponder data signals and is coupled to additional reader circuitry, which enable the reader to "read" the transponder data signals (i.e., extract the data from the transponder data signals). Accordingly, contactless communication is effected between the reader and the transponder in accordance with a specific communication protocol, which is likewise often unique to the particular manufacturer of the transponder and/or reader.

The excitation signal generating and transmitting functions and the transponder data signal receiving and reading functions performed by the reader as described above define a mode of reader operation termed a "data transaction mode." The data transaction mode further encompasses reader data signal generating and transmitting functions, wherein information stored in the reader memory or otherwise generated by the reader is communicated to the transponder. The manner in which the reader communicates information to the transponder is essentially the same or similar to the manner in which the transponder communicates information to the reader. As such, the reader data signals are characterized by essentially the same carrier frequency as the transponder data signals.

Although a reader can continuously operate in the data transaction mode, the functions of the data transaction mode typically have a relatively high power demand, which can rapidly deplete the power supply of the reader. This condition is particularly undesirable when the reader is powered by a self-contained portable power supply, such as a small disposable or rechargeable battery, which has a finite life. It is generally more power efficient to operate the reader in the data transaction mode only when a transponder is within the read range of the reader and to operate the reader in an alternate mode having a relatively lower power demand at all other times. A preferred alternate lower power mode of operation is termed a detection mode, which is commonly enabled by a ring signal generator circuit and a transponder detection circuit provided within the reader. The reader operates continuously in the detection mode except when the transponder detection circuit detects a transponder within the read range of the reader. The reader switches to the data transaction mode upon detection of a transponder, but only for a limited time sufficient to complete communication between the reader and transponder before switching back to the detection mode.

U.S. Pat. No. 6,476,708 to Johnson (the '708 Patent), which is incorporated herein by reference, discloses an exemplary reader having a low power detection mode and a high power data transaction mode of operation. The reader includes a signal generator circuit, having solid-state electronics, which alternately acts as the ring signal generator circuit or an excitation signal generator circuit depending on the operating mode of the reader at any given time. The reader further includes a small portable battery power supply and the transponder detection circuit which is coupled to the signal generator circuit.

The operating principle of the detection mode is to detect a transponder within the read range of the reader by measuring changes in a response on the reader antenna. The detection mode is initiated by generating a detection pulse using the signal generator circuit and applying the detection impulse to the reader antenna. The detection impulse causes the reader antenna to transmit a ring signal into the surrounding space, which has a frequency corresponding to the resonant frequency of the tuned LC circuit of the reader. The resulting ring signal causes a predictable response on the reader antenna. Although the ring signal has insufficient to power to operate any transponders residing in the surrounding space, if a transponder having a resonant frequency at or near the resonant frequency of the reader is sufficiently proximal to the reader, the response on the reader antenna is altered in a characteristic manner. In particular, inductive coupling of the reader antenna to the nearby transponder antenna causes a change in the response on the reader antenna.

The reader employs the transponder detection circuit to detect this change in the response. In particular, the transponder detection circuit monitors the level of a designated transponder detection parameter of the response. When the transponder detection parameter reaches a predetermined threshold level, the presence of a transponder in the surrounding space is confirmed and the transponder detection circuit switches the signal generator circuit from the low power detection mode to the high power data transaction mode thereby terminating generation of the ring signals. As such, the signal generator circuit transitions to an excitation signal generator circuit, wherein the signal generator circuit draws increased electrical current from the reader power supply to generate and transmit an excitation signal which is sufficient to activate the transponder. The excitation signal is received by the transponder and powers the transponder circuitry, which in turn generates a transponder data signal for transmission to the reader. After the reader reads the received transponder data signal, the signal generator circuit switches back to the detection mode and resumes generation of the ring signals while terminating generation of the excitation signals.

Since only ring signals are transmitted by the reader during the detection mode, the reader runs at a very low duty cycle and a variable repetition rate for the duration of the detection mode. Consequently, the above-described technique enables the reader to operate with a relatively low average power consumption to avoid accelerated dissipation of the reader power supply while maintaining a rapid response time for transponder detection.

The sensitivity, and correspondingly the detection range, of the reader in the detection mode is inter alia dependent on closely matching the tuned resonant frequencies of the reader and transponder LC circuits. However, as noted above, many transponder manufacturers elect to tune their transponders to resonant frequencies which differ from those of other transponder manufacturers. As a result, many different types of transponders are commercially available to practitioners designing, implementing or managing RFID systems, wherein each transponder type is characterized by a different transponder frequency, which is termed the transponder signature. Accordingly, when a given RFID system includes transponders from one or more different transponder manufacturers, the total population of transponders in the RFID system often includes one or more different types of transponders. Therefore, it is desirable to provide a transponder detector for a reader which is capable of detecting the presence of a transponder and determining the specific type of detected transponder.

Accordingly, it is generally an object of the present invention to provide a transponder detector for detecting the presence of a transponder selected from a plurality of transponder types and determining the specific type of transponder detected. More particularly, it is an object of the present invention to determine the specific type of transponder detected by comparing the signature of the detected transponder to the signature of a known transponder type. It is another object of the present invention to provide a transponder detector which acquires analog signals resulting from the transmission of a progression of detection signals at multiple frequencies and uses the analog signals to ascertain the signature of a detected transponder. It is another object of the present invention to provide a transponder detector which acquires analog signals resulting from the transmission of a progression of detection signals at multiple frequencies to ascertain a signature of a detected transponder relating to a specific transponder frequency from among a plurality of known transponder signatures. It is a further object of the present invention to provide a transponder detector which converts the acquired analog signals to digital signals and processes the digital signals to ascertain the signature of a detected transponder. It is a further object of the present invention to provide a transponder detector which processes the digital signals using a digital signal processing algorithm to ascertain the signature of a detected transponder. It is yet a further object of the present invention to provide a transponder detector which processes the digital signals using a digital signal processing algorithm, wherein the digital signal processing algorithm is designed to protect the solid-state circuitry of the transponder detector from damage due to high radio frequency energy field strength. It is still a further object of the present invention to provide a transponder detector which initiates a data transaction mode of operation in a reader upon detecting the presence of a transponder and determining the type of detected transponder.

It is generally another object of the present invention to provide a transponder detector which can effectively operate in a detection mode at a very low power level relative to the power level of the data transaction mode of an associated reader. It is generally another object of the present invention to provide a transponder detector which can effectively operate while magnetically interfering objects other than transponders are in the proximal space of the transponder detector. These objects and others are accomplished in accordance with the invention described hereafter.

SUMMARY OF THE INVENTION

The present invention is a transponder detector comprising an antenna assembly and a first circuit and second circuit, each coupled to the antenna assembly. The first circuit is configured to generate and transmit first and second detection signals at first and second frequencies, respectively, via the antenna assembly. The second circuit is configured to receive response signals from the antenna assembly resulting from transmission of the first and second detection signals, wherein the response signals have a transponder detection parameter. The transponder detection parameter is preferably a decay rate of the response signals, a voltage of the response signals, or an amount of detection signal energy absorbed by an environment surrounding the antenna assembly.

The transponder detector preferably further includes a controller which is configured to detect the presence of a transponder in a proximal space of the transponder detector based on values of the transponder detection parameter. The controller is preferably configured to detect the proximal presence of a transponder having a transponder frequency corresponding to the first or second frequency and is preferably further configured to determine a transponder type of the detected transponder by comparing the transponder frequency of the detected transponder to a known transponder signature. The controller preferably includes an analog to digital converter configured to convert the response signals which are analog signals to digital signals and to process the digital signals to determine the values of the transponder detection parameter.

In accordance with one embodiment, the first circuit includes a series resistance and a parallel capacitance. The series resistance has a switched series resistor and a resistance switch and the series resistance is connected between a ping output signal source and the antenna assembly such that frequency of the detection signals is changeable by controlling positions of the resistance switch. The parallel capacitance has a switched parallel capacitor and a capacitance switch and the parallel capacitance is also connected between the ping output signal source and the antenna assembly such that frequency of the detection signals is changeable by controlling positions of the capacitance switch. The first circuit preferably generates the first detection signal at the first frequency lower than the second frequency by setting the capacitance switch to a closed position to increase capacitance and setting the resistance switch to an open position to increase resistance. Conversely, the first circuit generates the second detection signal at the second frequency higher than the first frequency by setting the capacitance switch to an open position to decrease capacitance and setting the resistance switch to a closed position to decrease resistance.

In accordance with an alternate embodiment, the series resistance of the first circuit has a first switched series resistor, a first resistance switch, a second switched series resistor, and a second resistance switch. The parallel capacitance of the first circuit has a first switched parallel capacitor, a first capacitance switch, a second switched parallel capacitor and a second capacitance switch. As such, the first circuit is configured to generate and transmit a detection signal progression including a high frequency detection signal at a high frequency, a middle frequency detection signal at a middle frequency, and a low frequency detection signal at a low frequency via the antenna assembly. The detection signal progression is generated by cooperatively controlling positions of the first and second resistance and capacitance switches. The second circuit is configured to receive a progression of response signals from the antenna assembly, wherein the progression of response signals has a transponder detection parameter.

The first circuit preferably generates the low frequency detection signal by setting the first and second capacitance switches to a closed position to create a high level of capacitance and setting the first and second resistance switches to an open position to create a high level of resistance. The first circuit preferably generates the high frequency detection signal by setting the first and second capacitance switches to an open position to create a low level of capacitance and setting the resistance switches to a closed position to create a low level of resistance. The first circuit preferably generates the middle frequency detection signal by setting the first capacitance switch to a closed position and the second capacitance switch to an open position to create a middle level of capacitance and setting the first resistance switch to an open position and the second resistance switch to a closed position to create a middle level of resistance.

In an alternate characterization, the present invention is a reader for an RFID system. The reader comprises a reader antenna assembly, an excitation signal generator circuit and a transponder signal receiver circuit coupled to the reader antenna assembly, a main controller coupled to the excitation signal generator and transponder signal receiver circuits, and a wakeup unit coupled between the reader antenna assembly and the main controller. The wakeup unit is configured to generate and transmit first and second detection signals at first and second frequencies, respectively, via the reader antenna assembly.

The wakeup unit preferably comprises a detection signal generator circuit and a response signal receiver circuit coupled to the reader antenna assembly and a wakeup controller coupled to the detection signal generator and response signal receiver circuits. The detection signal generator circuit is configured to generate the first and second detection signals and the response signal receiver is configured to receive a plurality response signals resulting from transmission of the first and second detection signals, respectively, on the reader antenna assembly, wherein the response signals have a transponder detection parameter. The wakeup controller is configured to evaluate a change in value of the transponder detection parameter to detect a transponder in a read range of the reader. The main controller preferably transitions the excitation signal generator circuit and the transponder signal receiver circuit from a low power detection mode to a high power data transaction mode upon detection of the transponder. The wakeup controller may optionally be further configured to determine a type of the transponder detected in the read range of the reader.

In accordance with one embodiment, the detection signal generator circuit includes a series resistance and a parallel capacitance. The series resistance has a switched series resistor and a resistance switch and the series resistance is connected between a ping output signal source and the antenna assembly such that frequency of the detection signals is changeable by controlling positions of the resistance switch. The parallel capacitance has a switched parallel capacitor and a capacitance switch and the parallel capacitance is also connected between the ping output signal source and the antenna assembly such that frequency of the detection signals is changeable by controlling positions of the capacitance switch.

In accordance with an alternate embodiment, the series resistance of the detection signal generator circuit has a first switched series resistor, a first resistance switch, a second switched series resistor, and a second resistance switch. The parallel capacitance of the first circuit has a first switched parallel capacitor, a first capacitance switch, a second switched parallel capacitor and a second capacitance switch. As such, the detection signal generator circuit is configured to generate and transmit a detection signal progression including a high frequency detection signal at a high frequency, a middle frequency detection signal at a middle frequency, and a low frequency detection signal at a low frequency via the antenna assembly. The detection signal progression is generated by cooperatively controlling positions of the first and second resistance and capacitance switches. The response signal circuit is configured to receive a progression of response signals from the antenna assembly, wherein the progression of response signals has a transponder detection parameter.

In another characterization, the present invention is a frequency ranging method for transponder detection and characterization. The method transmits first and second detection signals at first and second frequencies, respectively, via an antenna assembly into a surrounding environment. A plurality of response signals are received from the antenna assembly resulting from transmission of the first and second detection signals, respectively, wherein the response signals have a transponder detection parameter. A transponder having a transponder frequency is detected in a proximal space of the antenna assembly based on a change in value of the transponder detection parameter for the response signals. The type of the detected transponder is also preferably determined by comparing the transponder frequency of the detected transponder to a known transponder signature. The method optionally further comprises performing a data transaction with the transponder if the change in value of the transponder detection signal for the response signals reaches or passes a response threshold level. In accordance with one embodiment, the response signals are analog signals, which are converted to digital signals. The change in value of the transponder detection signal for the response signals is determined by processing the digital signals.

In accordance with another embodiment, the first detection signal is generated at the first frequency lower than the second frequency by selectively increasing capacitance and resistance in a circuit path of a ping signal. The second detection signal is generated at the second frequency higher than the first frequency by selectively decreasing the capacitance and resistance in the circuit path of the ping signal.

In another characterization, the present invention is a frequency ranging method which transmits a progression of detection signals via the antenna assembly, wherein the progression of detection signals includes a high frequency detection signal at a high frequency, a middle frequency detection signal at a middle frequency and a low frequency detection signal a low frequency. A progression of response signals are received from the antenna assembly resulting from transmission of the progression of detection signals, wherein the response signals have a transponder detection parameter. A transponder having a transponder frequency is detected in a proximal space of the antenna assembly based on a change in value of the transponder detection parameter for the progression of response signals. In accordance with one embodiment, the response signals are analog signals, which are converted to digital signals. The change in value of the transponder detection signal for the response signals is determined by processing the digital signals.

The present invention will be further understood from the drawings and the following detailed description. Although this description sets forth specific details, it is understood that certain embodiments of the invention may be practiced without these specific details. It is also understood that in some instances, well-known circuits, components and techniques have not been shown in detail in order to avoid obscuring the understanding of the invention.

Embodiments of the invention are illustrated by way of example and not by way of limitation in the above-recited figures of the drawings in which like reference characters indicate the same or similar elements. It should be noted that common references to "an embodiment", "one embodiment", "an alternate embodiment", "a preferred embodiment", or the like herein are not necessarily references to the same embodiment.

DESCRIPTION OF PREFERRED EMBODIMENTS

Figure 1:
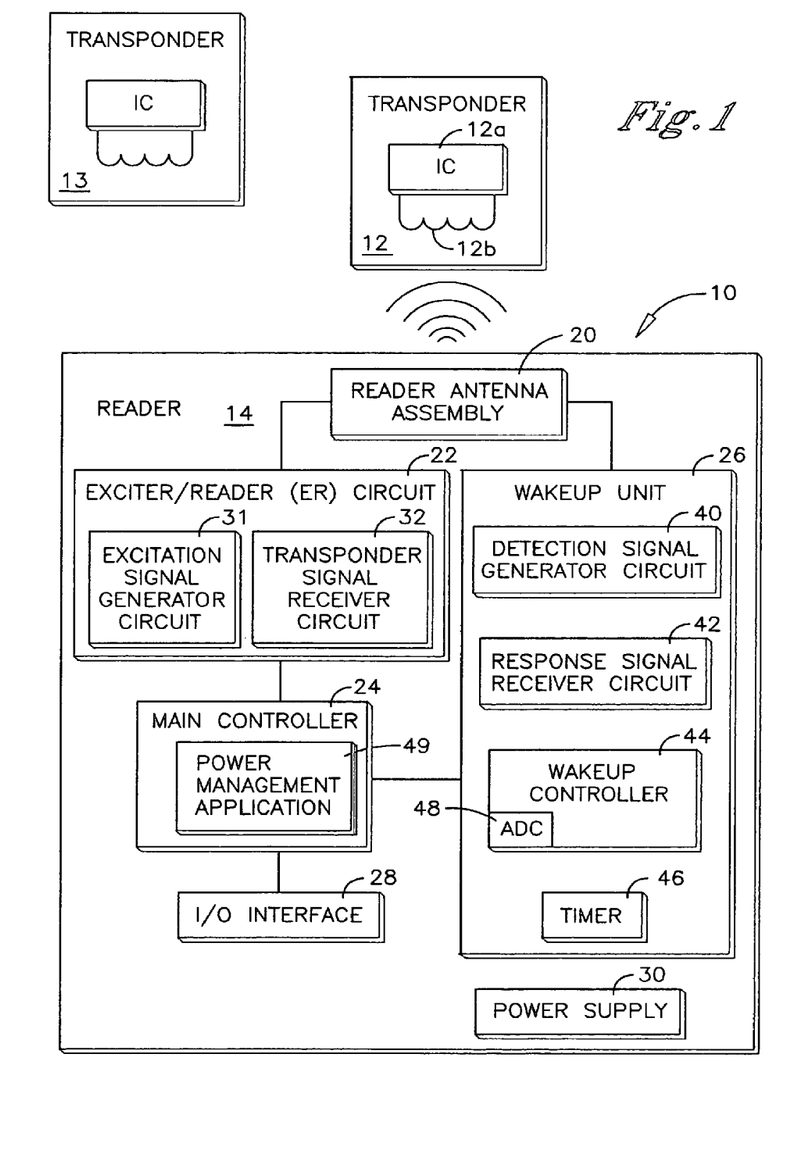
FIG. 1 is a block diagram of an RFID system including a transponder and a reader having a reader antenna assembly and wakeup unit of the present invention.

An RFID system is shown in FIG. 1 and generally designated 10. The RFID system 10 comprises a transponder 12 and a reader 14. The reader 14 includes a transponder detector of the present invention which is described below. The transponder 12 is preferably a passive transponder which does not require an internal power supply. Instead the electrical power required to operate the transponder 12 is supplied to the transponder 12 by electromagnetic energy transmitted from the reader 14. Accordingly, the transponder 12 is operational when it receives electromagnetic waves from the reader, which are of a specific frequency and of a sufficient strength to power up the transponder.

The transponder 12 comprises a number of functional elements including a transponder integrated circuit (IC) 12a and a transponder antenna 12b. The transponder IC 12a embodies the processing and memory capabilities of the transponder 12. The transponder antenna 12b is coupled to the transponder IC 12a and is a conventional inductive antenna coil termed a "dual-function antenna coil" which performs both the receiving and transmitting functions of the transponder 12. Alternatively, two separate receiving and transmitting antenna coils (not shown) can be substituted for the single dual-function antenna coil in the transponder 12. The transponder 12 also preferably includes an external transponder tuning capacitor (not shown) coupled to the transponder IC 12a and to each antenna coil of the transponder antenna 12b. The term "external" is used above with respect to the transponder 12 to designate electronic components which are not physically or functionally included within the transponder IC 12a.

The term "tuning capacitor" is used herein to describe a capacitor preferably having a fixed capacitance which, in cooperation with the transponder antenna 12b, establishes the transponder frequency of the transponder 12. The term "tuned resonant frequency" is used herein to describe a resonant frequency of the transponder LC circuit which is typically fixed at the time of transponder manufacture by selection of a specific transponder antenna and a specific cooperative tuning capacitor. Thus, the tuned resonant frequency of the transponder LC circuit in the transponder 12 is preferably non-adjustable after manufacture of the transponder. The term "transponder frequency" corresponds to the tuned resonant frequency of the transponder LC circuit in the transponder 12 and likewise to the carrier frequency of the transponder 12.

The transponder 12 is preferably a specific type of low frequency transponder or high frequency transponder having a distinct transponder signature. In any case, the transponder 12 described herein is but one example of any number of transponders having utility in the present RFID system 10. It is understood that practice of the present invention is not limited to any one type of transponder having a specific frequency, communication protocol, or circuit design, but is generally applicable to any number of transponders having utility in RFID systems.

In most conventional RFID systems, the position of the reader is stationary (i.e., constant) relative to the surrounding environment, while the position of the transponder is portable (i.e., variable) within the surrounding environment. In such cases, the user of the RFID system moves the portable transponder into relative proximity with the stationary reader to enable simultaneous operation of both the transponder and reader. In some conventional RFID systems, however, the position of the reader may be portable relative to the surrounding environment, while the position of the transponder is either portable or stationary. In the case of a portable reader and a stationary transponder, the user moves the portable reader into relative proximity with the stationary transponder to enable simultaneous operation of both the transponder and reader. In the case of a portable reader and a portable transponder, the user may move both the portable reader and the portable transponder into relative proximity with one another to enable simultaneous operation of both the transponder and reader. Embodiments of the present invention are not limited to any one of the above-recited RFID system configurations.

The reader 14 is generally characterized as being capable of detecting the presence of the transponder 12 in proximity thereto, determining the type of the detected transponder 12, and thereafter contactlessly communicating information between the reader 14 and the transponder 12. The reader 14 comprises a number of functional elements including a reader antenna assembly 20, an exciter/reader (ER) circuit 22, a main controller 24, a wakeup unit 26, an input/output (I/O) interface 28, and a power supply 30.

The power supply 30 provides electrical operating power to the reader components in a controlled manner. In accordance with one embodiment, the power supply 30 is coupled to a finite electrical power source which is self-contained (i.e., internal) within the reader 14, such as a relatively small portable battery consisting of one or more disposable cells or rechargeable cells, wherein the cells are wet or dry. Alternatively, the power supply 30 is hard wired to an essentially infinite remote electrical power source, such as an electric utility.

The ER circuit 22 comprises an excitation signal generator circuit 31 and a transponder signal receiver circuit 32. The excitation signal generator circuit 31 generally functions to generate an excitation signal which the reader antenna assembly 20 transmits in the form of electromagnetic waves into the open space of the external environment surrounding the reader 14. The excitation signals are received by the transponder 12 in the proximal space of the reader 14 (i.e., within a read range of the reader) to power up the transponder 12. Upon activation, the transponder IC 12a generates a transponder data signal, which contains readable information, i.e., transponder data, copied or otherwise derived from the memory of the transponder IC 12a. The transponder data signal is transmitted into the open space of the external environment surrounding the transponder 12 via the transponder antenna 12b. When a transponder data signal is received at the reader antenna assembly 20, the transponder signal receiver circuit 32 performs various operations on the transponder data signal to condition the signal, thereby producing a conditioned signal which is suitable for reading by the reader 14.

The conditioned signal containing the data from the transponder data signal is conveyed to the main controller 24, which processes the conditioned signal to extract the readable transponder data contained therein. In particular, the main controller 24 demodulates the conditioned signal in accordance with a respective modulation type according to firmware and/or software executed by the main controller 24. The resulting extracted transponder data may be sent to an external device such as a central host computer (not shown) via the I/O interface 28. The main controller 24 is preferably substantially any device which is capable of processing the transponder data signal and directing certain other functional operations of the reader 14 as recited below. Thus, for example, the main controller 24 can be a microprocessor or an application specific integrated circuit (ASIC).

As noted above, the excitation signal generator circuit 31 and the transponder signal receiver circuit 32 in combination are termed the ER circuit 22. Skilled artisans can appreciate that the reader 14 can be adapted in accordance with the present invention to include a writer circuit (not shown) which is capable of writing programming instructions or other information to a transponder by either contact or contactless means. The ER circuit and writer circuit in combination are termed an exciter/reader/writer (ERW) circuit.

Figure 2:
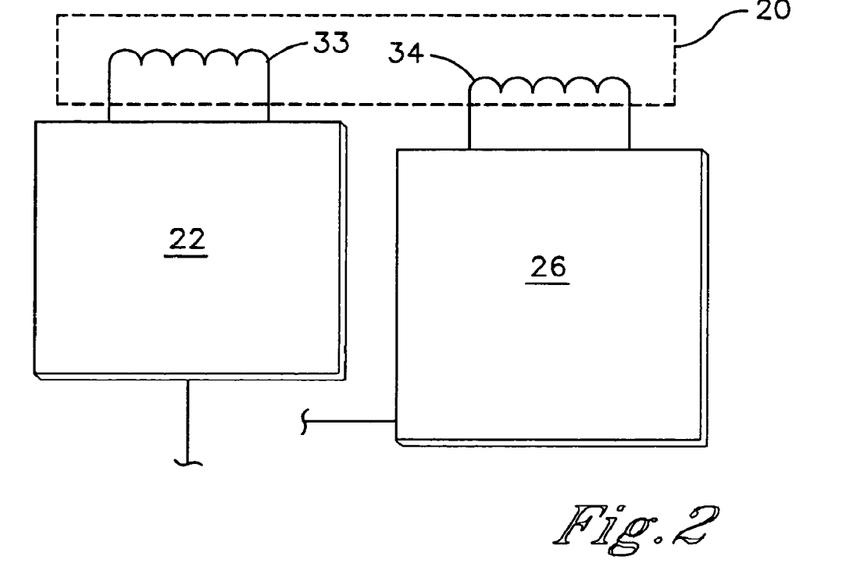
FIG. 2 is a block diagram of an embodiment of the reader antenna assembly of FIG. 1.

The reader antenna assembly 20 encompasses a number of alternate embodiments. Referring to FIG. 2, an embodiment of the reader antenna assembly 20 is shown and described which consists of two separate antenna coils 33, 34. The first antenna coil 33 is an ER antenna coil coupled and functionally dedicated to the ER circuit 22. The second antenna coil 34 is a wakeup antenna coil coupled and functionally dedicated to the wakeup unit 26. The ER antenna coil 33 is preferably associated with an ER tuning capacitor (not shown) thereby forming an ER LC circuit. The wakeup antenna coil 34 is preferably associated with a wakeup tuning capacitor (not shown), thereby forming a wakeup LC circuit. The ER antenna coil 33 shown herein is a dual-function antenna coil which performs both the receiving and transmitting functions of the ER circuit 22. The wakeup antenna coil 34 shown herein is similarly a dual-function antenna coil which performs both the receiving and transmitting functions of the wakeup unit 26 described below.

Although not shown, the reader antenna assembly 20 alternately includes an ER antenna having two separate ER antenna coils, each of which is a single-function antenna coil. In particular, the first ER antenna coil is a receiving ER antenna coil and the second ER antenna coil is a transmitting ER antenna coil. The receiving and transmitting ER antenna coils separately perform the receiving and transmitting functions, respectively, of the ER circuit 22. In another alternative, the reader antenna assembly 20 includes an ER antenna having a separate dual-function ER antenna coil for each different detection signal frequency generated by the ER circuit 22 as described hereafter. Each ER antenna coil performs both the receiving and transmitting functions of the ER circuit 22 for only one detection signal frequency. In still another alternative, the reader antenna assembly 20 includes an ER antenna having two separate ER antenna coils for each different detection signal frequency generated by the ER circuit 22. Each of the two ER antenna coils for a given detection signal frequency is a single-function antenna coil. The first ER antenna coil is a receiving ER antenna coil which performs the receiving function of the ER circuit 22 for only that given detection signal frequency. The second ER antenna coil is a transmitting ER antenna coil which performs the transmitting function of the ER circuit 22 for only that given detection signal frequency.

The reader antenna assembly 20 similarly alternately includes a wakeup antenna having two separate wakeup antenna coils, each of which is a single-function antenna coil. In particular, the first wakeup antenna coil is a receiving wakeup antenna coil and the second wakeup antenna coil is a transmitting wakeup antenna coil. The receiving and transmitting wakeup antenna coils separately perform the receiving and transmitting functions, respectively, of the wakeup unit 26. In another alternative, the reader antenna assembly 20 includes a wakeup antenna having a separate dual-function wakeup antenna coil for each different transponder frequency encountered by the wakeup unit 26 as described hereafter. Each wakeup antenna coil performs both the receiving and transmitting functions of the wakeup unit 26 for only one transponder frequency. In still another alternative, the reader antenna assembly 20 includes a wakeup antenna having two separate wakeup antenna coils for each different transponder frequency encountered by the wakeup unit 26. Each of the two wakeup antenna coils for a given transponder frequency is a single-function antenna coil. The first wakeup antenna coil is a receiving wakeup antenna coil which performs the receiving function of the wakeup unit 26 for only that given detection signal frequency. The second wakeup antenna coil is a transmitting wakeup antenna coil which performs the transmitting function of the wakeup unit 26 for only that given detection signal frequency.

Figure 3:
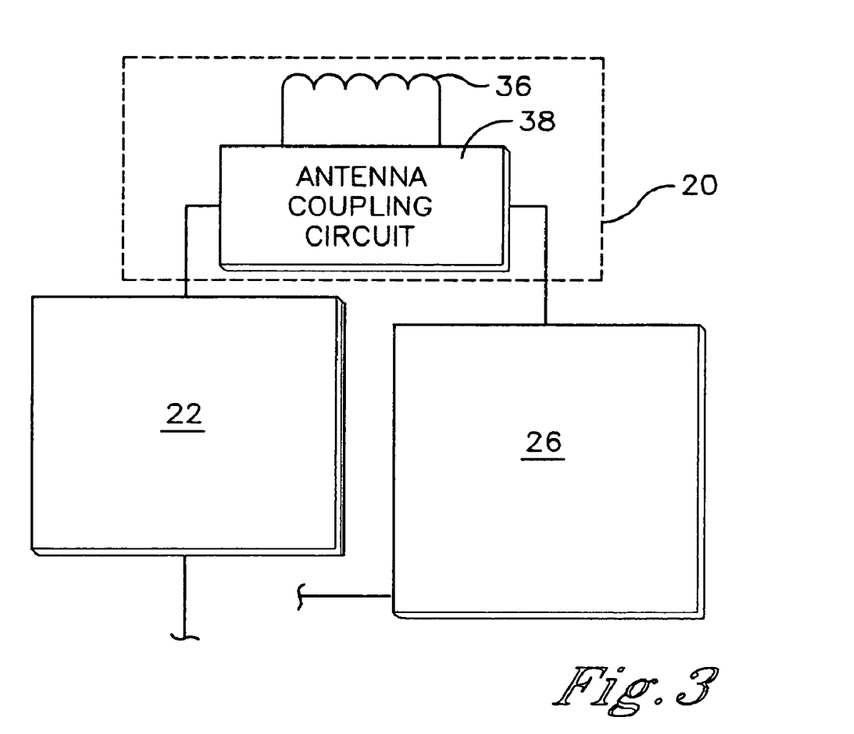
FIG. 3 is a block diagram of an alternate embodiment of the reader antenna assembly of FIG. 1.

Referring to FIG. 3, an alternate embodiment of the reader antenna assembly 20 consists of a single reader antenna coil 36 coupled to an antenna coupling circuit 38. The reader antenna coil 36 is preferably associated with a reader tuning capacitor (not shown) to form a reader LC circuit. The antenna coupling circuit 38 is coupled between the ER circuit 22 and the wakeup unit 26 and enables the reader LC circuit to perform the transmitting and receiving functions of both the ER circuit 22 and the wakeup unit 26. As noted above, the reader antenna coil 36 shown herein is a dual-function antenna coil which performs the receiving and transmitting functions of both the ER circuit 22 and the wakeup unit 26. Although not shown, the reader antenna assembly 20 alternately includes a reader antenna having a receiving reader antenna coil and a separate transmitting reader antenna coil. The receiving reader antenna coil performs the receiving functions of both the ER circuit 22 and the wakeup unit 26, while the transmitting reader antenna coil performs the transmitting functions of both the ER circuit 22 and the wakeup unit 26. In still another alternative, the reader antenna assembly 20 includes a reader antenna having a dual-function reader antenna coil for each different detection signal frequency generated by the ER circuit 22, or having a receiving reader antenna coil and a separate transmitting reader antenna coil, respectively, for each different detection signal frequency generated by the ER circuit 22.

The reader 14 has at least two modes of operation, namely, a low power detection mode and a high power data transaction mode (alternately referred to as a "read mode"). The detection mode is the initial operating mode of the reader 14, wherein the wakeup unit 26 functions as a transponder detector to actively seek any transponders 12 residing in the surrounding space proximal to the reader 14, i.e., within the read range of the reader 14. Since the ER circuit 22 and main controller 24 are characterized as having a high power demand when performing read mode functions, the reader 14 is configured to deactivate most or all of the components and functions associated with the ER circuit 22, main controller 24 and I/O interface 28 during the detection mode. Substantial power savings are achieved by using the wakeup unit 26 as the sole or primary operating unit for performing the transponder detection function during the detection mode because the wakeup unit 26 is characterized as having a low power demand. Although the wakeup unit 26 is shown herein as being structurally and functionally integral with the reader 14, it is apparent to the skilled artisan applying the teaching herein that the wakeup unit 26 can alternately be constructed and/or adapted to function as a stand-alone transponder detector apart from the reader 14.

The wakeup unit 26 comprises a detection signal generator circuit 40, a response signal receiver circuit 42, a wakeup controller 44 and a timer 46. The wakeup controller 44 is configured to control operation of the wakeup unit 26 as described in greater detail below. As such, the wakeup controller 44 is preferably substantially any device which is capable of directing functional operation of the wakeup unit 26. For example, the wakeup controller 44 can be a microprocessor or an application specific integrated circuit (ASIC).

The timer 46 is coupled to the wakeup controller 44 and periodically generates wakeup interrupt signals for the wakeup controller 44, which initiate the active detection steps of the wakeup unit 26. An exemplary timer 46 is a low power timing means, such as a watchdog, which provides timing cues to the wakeup controller 44. Alternatively, although not shown, the timer is an internal timer included within, or otherwise integral with, the wakeup controller 44 or main controller 24. To further reduce power consumption during the detection mode, the wakeup controller 44 preferably remains in a SLEEP state (i.e., a reduced power state) throughout the detection mode, only switching to an awake state (i.e., an increased power state) when the wakeup controller 44 receives a wakeup interrupt signal from the timer 46.

The detection signal generator circuit 40 is coupled between the reader antenna assembly 20 and the wakeup controller 44 to generate detection signals. The detection signal is preferably a ring signal in the form of a decaying sine wave. The detection signal generator circuit 40 is capable of generating a serial progression of detection signals at a plurality of different frequencies in a manner described below. Also coupled between the reader antenna assembly 20 and the wakeup controller 44 is the response signal receiver circuit 42, which is capable of receiving a serial progression of analog response signals from the reader antenna assembly 20 resulting from the transmission of the serial progression of detection signals on the reader antenna assembly 20, and more particularly on the wakeup antenna coil 34 or reader antenna coil 36.

In one embodiment, the response signal receiver circuit 42 is configured to sample and hold the analog response signals and convey the analog response signals to the wakeup controller 44. The wakeup controller 44 preferably includes an analog to digital converter (ADC) 48 which receives the analog response signals from the response signal receiver circuit 42 and converts them to digital response signals. The wakeup controller 44 processes the resulting digital response signals, preferably using a digital signal processing (DSP) algorithm, to detect the presence of the transponder 12 within the read range of the reader 14. The wakeup controller 44 further uses the DSP algorithm to determine the type of the transponder 12, if present, by comparing the ascertained signature of the transponder 12 (i.e., the specific transponder frequency) to known transponder signatures used by different transponder manufacturers. If the wakeup controller 44 detects the transponder 12 and determines the transponder type, the wakeup controller 44 sends a transponder recognized signal to the main controller 24 indicating that the transponder 12 has been detected and the type determined.

The main controller 24 activates the ER circuit 22 in response to the transponder recognized signal, thereby switching the reader 14 from the low power detection mode to the high power data transaction mode. The specific activation function is preferably performed by the power management application 49 located within the main controller 24. In addition to controlling power consumption of components external to the main controller 24, the power management application 49 also preferably controls power consumption relating to various internal functions of the main controller 24 by selectively powering off internal segments of the main controller 24 which are not in use during the detection or data transaction modes.

Figure 4:
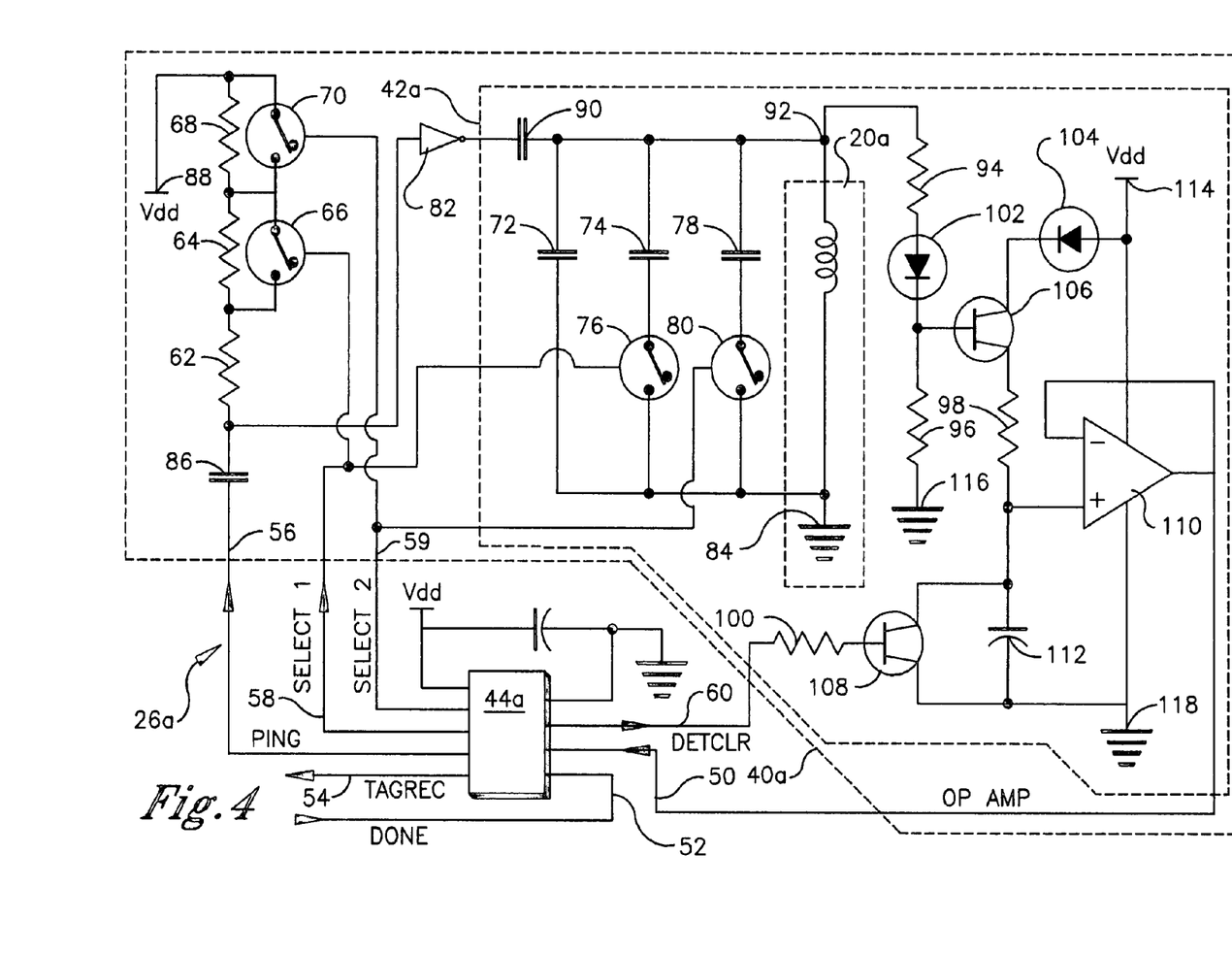
FIG. 4 is a schematic view of an embodiment of the wakeup unit of FIG. 1.

Referring to FIG. 4, an embodiment of a wakeup unit of the present invention is shown and designated 26a. Elements of FIG. 4 which are specific embodiments of elements shown generally in FIG. 1 are designated by the same reference character, but with the suffix "a" added. The wakeup unit 26a is configured to generate a serial progression of detection signals at a plurality of different frequencies. The wakeup unit 26a comprises a detection signal generator circuit 40a, a response signal receiver circuit 42a, and a wakeup controller 44a. In addition a cooperative antenna assembly 20a is associated with the wakeup unit 26a. The wakeup controller 44a is provided with OP_AMP and DONE inputs 50, 52 to receive OP_AMP and DONE input signals, respectively. The wakeup controller 44a is further provided with TAGREC, PING, SELECT1, SELECT2, and DETCLR outputs, 54, 56, 58, 59, 60 to send TAGREC, PING, SELECT1, SELECT2, and DETCLR output signals, respectively, which are generated by the wakeup controller 44a.

The wakeup controller 44a of the present embodiment is shown having two select signal outputs, i.e., SELECT1 output 58 and SELECT2 output 59, for purposes of illustration. It is within the scope of the present invention, for the wakeup controller 44 to have any integer number N of select signal outputs. Accordingly, each select signal output of the wakeup controller 44 is generally designated SELECTX output, on which a SELECTX output signal generated by the wakeup controller 44 is sent, wherein X=1, 2, 3 . . . N. The precise value of X for a given embodiment of the wakeup controller 44 is determined by the number of switched resistor/capacitor pairs in the detection signal generator circuit 40a as described below.

The detection signal generator circuit 40a includes an unswitched series resistor 62, a first switched series resistor 64, a first resistance switch 66, a second switched series resistor 68, a second resistance switch 70, a first unswitched parallel capacitor 72, a first switched parallel capacitor 74, a first capacitance switch 76, a second switched parallel capacitor 78, a second capacitance switch 80, and an inverter 82 which is connected between the series resistance 62, 64, 66, 68, 70 and the parallel capacitance 72, 74, 76, 78, 80. The first resistance switch 66 is connected between the two terminals of the first switched series resistor 64 and the second resistance switch 70 is connected between the two terminals of the second switched series resistor 68. The first capacitance switch 76 is connected between the first switched parallel capacitor 74 and ground 84 and the second capacitance switch 80 is connected between the second switched parallel capacitor 78 and ground 84. The ground 84 is alternatively a negative voltage source. An exemplary voltage value is 0 VDC.

The first resistance and capacitance switches 66, 76 are coupled to the SELECT1 output 58 to receive SELECT1 output signals. The second resistance and capacitance switches 70, 80 are coupled to the SELECT2 output 59 to receive SELECT2 output signals. A first capacitor 86 is connected between the PING output 56 and the series resistance, such that the series resistance receives PING output signals via the PING output 56 and first capacitor 86. A first voltage source (+$V_{dd}$) 88 is coupled to a terminal of the second switched series resistor 68. An exemplary voltage value of the first voltage source 88 is 4+/−1 VDC.

The resistance and capacitance switches 66, 70, 76, 80 comprise any suitable switching element or combination of switching elements. For example, switching elements may be selected from among Bipolar Junction Transistors (BJTs), Field-Effect Transistor (FET) switches, Metal Oxide Semiconductor Field-Effect Transistor (MOSFET) switches, relays, electrically programmable resistance (EPOTs), and analog switches. The SELECT1 output signals open or close the first resistance and capacitance switches 66, 76 and the SELECT2 output signals similarly open or close the second resistance and capacitance switches 70, 80, thereby selectively controlling the frequency of the detection signals generated by the detection signal generator circuit 40a in a manner described below.

A second capacitor 90 is connected between the inverter 82 and the parallel capacitance. The parallel capacitance is coupled to ground 84 and the antenna assembly 20a via an antenna input/output node 92. Thus, the antenna assembly 20a is connected in parallel with the first unswitched parallel capacitor 72, first switched parallel capacitor 74, and second switched parallel capacitor 78. As such, the output of the parallel capacitance (and correspondingly the input to the antenna assembly 20a) is the antenna input/output node 92. Although the inverter 82 is shown herein as a single element, any suitable number of inverter elements may be included within the inverter 82 to achieve a desired power and/or range of the detection signal for a particular antenna assembly 20a.

The detection signal generator circuit 40a further comprises first, second, third and fourth resistors 94, 96, 98, 100, first and second diodes 102, 104, first and second transistors 106 and 108, an operational amplifier 110, a third capacitor 112, and a second voltage source (+$V_{dd}$) 114. The input to the first resistor 94 is the antenna input/output node 92. The base of the first transistor 106 is connected between the first diode 102 and the second resistor 96. The opposite end of the second resistor 96 is connected to ground 116. The emitter of the first transistor 106 is connected to the third resistor 98 and the collector of the first transistor 106 is connected to the second voltage source 114 via the second diode 104. The emitter of the second transistor 108 is connected to ground 118, the collector of the second transistor 108 is connected to the non-inverting input of the operational amplifier 110, and the base of the second transistor 108 is connected to the DETCLR output 60 via the fourth resistor 100 to receive the DETCLR (detection clear) output signal from the wakeup controller 44a.

The operational amplifier 110 is connected between the second voltage source 114 (which preferably has a voltage value less than the first voltage source 88) and ground 118. As noted above, the noninverting input of the operational amplifier 110 is connected to the collector of the second transistor 108. The output of the operational amplifier 110 is connected to its inverting input and to the OP_AMP input 50, enabling the wakeup controller 44a to receive analog OP_AMP input signals from the operational amplifier 110.

The wakeup controller 44a initiates a serial progression of detection signals by periodically generating and sending a plurality of preferably identical PING output signals (also termed pulse signals) via the PING output 56. Each PING output signal is routed in series through the first capacitor 86, series resistance, inverter 82, series capacitance, and antenna input/output node 92 to the antenna assembly 20a, thereby producing a ring signal (i.e., detection signal) on the coil of the antenna assembly 20a. The inverter 82 preferably shapes each PING output signal to a selected width and amplitude, wherein the pulse width is preferably selected as a function of the tuned frequency of the LC circuit of the ER circuit 22 and the tuned frequency of the LC circuits of any transponders expected within the read range of the reader 14. An exemplary selected pulse width is 36.9 nanoseconds, which produces a wavy detection signal in the form of a decaying sine wave at 13.56 MHz on the coil of the antenna assembly 20*a*.

The detection signal generator circuit 40*a* employs the series resistance and parallel capacitance, which are responsive to specific SELECT1 and SELECT2 output signals, to selectively raise or lower the frequency value of the detection signals generated by the detection signal generator circuit 40*a* from a baseline or middle frequency value. In this manner, the detection signal generator 40*a* is able to generate a progression of detection signals, wherein each detection signal in the progression has a different frequency value.

In the present embodiment illustrated in FIG. 4, the detection signal generator circuit 40*a* is able to generate a serial progression of three different detection signals, each detection signal having a high frequency value, a middle frequency value, or a low frequency value, respectively. In particular, the detection signal generator 40*a* generates a first detection signal of the progression having the low frequency value by closing the first and second capacitance switches 76, 80 and opening both the first and second resistance switches 66, 70, which increases both the capacitance and resistance to a high level. The detection signal generator 40*a* generates a second detection signal of the progression having the middle frequency value by opening the second capacitance switch 80, while maintaining the first capacitance switch 76 closed and closing the second resistance switch 70, while maintaining the first resistance switch open 66, which reduces both the capacitance and resistance to a middle level. The detection signal generator 40*a* generates a second detection signal of the progression having the high frequency value by opening both the first and second capacitance switches 76, 80 and closing both the first and second resistance switches 76, 80, which reduces both the capacitance and resistance to a low level.

The values of the series resistors 62, 64, 68 and the parallel capacitors 72, 74, 78 and other elements of the detection signal generator circuit 40*a* are selected to generate the desired range of frequencies within the detection signal progression. The types of transponders which the wakeup unit 26*a* is capable of detecting and with which the reader 14 is capable of communicating are dictated by the range of detection signal frequencies generated by the detection signal generator circuit 40*a*. For example, the detection signal generator circuit 40*a* can be configured to generate a progression of detection signals having frequencies in a range from about 13 MHz to 18 MHz, thereby enabling detection and identification of transponder types having transponder frequencies within a corresponding range. Alternatively, the detection signal generator circuit 40*a* can be configured to generate a progression of detection signals having frequencies in a range from about 100 kHz to 150 kHz. It is understood that the present invention is not limited to any one detection signal frequency range and that the detection signal generator circuit 40*a* can be configured to cover any suitable frequency range desired and any desired frequency values within the selected frequency range.

The detection signal generator circuit 40*a* of the present embodiment is shown by way of illustration as having a first switched resistor/capacitor pair 64, 74 and a second switched resistor/capacitor pair 68, 78 to generate a progression of detection signals at three different frequencies within a given frequency range. It is understood that the detection signal generator circuit 40 can have any integer number N of switched resistor/capacitor pairs (and correspondingly N select signal outputs as noted above). As N increases, the range and number of frequencies within the detection signal progression that the detection signal generator circuit 40 is capable of generating increases as well. For example, if N=3, the detection signal generator circuit 40 can generate a serial progression of four detection signals, each having a different frequency. The frequency of the detection signals is set by selectively opening or closing the respective switches to the elements within each of the N switched resistor/capacitor pairs in a substantially similar manner as described above with respect to the two switched resistor/capacitor pairs 64, 74 and 68, 78.

The present detection signal generator circuit 40*a* can be alternately configured to generate a single detection signal at one frequency if desired. A single frequency embodiment of the detection signal generator circuit 40 is configured by removing or simply not using the first and second switched series resistors 64, 68 and the first and second switched parallel capacitors 74, 78 in the detection signal generator circuit 40*a* of FIG. 4 and deactivating the SELECT1 and SELECT2 outputs 58, 59.

The response signal receiver circuit 42*a* of the wakeup unit 26*a* comprises a number of elements which are also employed in the detection signal generator circuit 40*a* as described above. In particular, the response signal receiver circuit 42*a* comprises the above-recited parallel capacitance, first, second, third and fourth resistors 94, 96, 98, 100, first and second diodes 102, 104, first and second transistors 106 and 108, operational amplifier 110, third capacitor 112, second voltage source 114, and antenna input/output node 92.

Each detection signal of the serial progression routed to the antenna assembly 20*a* via the antenna input/output node 92 generates a corresponding analog response signal on the antenna assembly 20*a* which is input to the response signal receiver circuit 42*a* via the antenna input/output node 92. The response signal receiver circuit 42*a* conditions the analog response signal and conveys the conditioned response signal as the analog OP_AMP input signal to the wakeup controller 44*a* via the OP_AMP input 50. The ADC 48 (shown in FIG. 1) of the wakeup controller 44*a* converts the analog OP_AMP input signal to a digital response signal. The wakeup controller 44*a* processes the resulting digital response signal and each succeeding response signal in the resulting progression of response signals using the DSP algorithm to evaluate the decay rate of the response signal wave form.

It is noted that the decay rate of the progression of response signals is one of any number of preferred detection parameters which may be used to detect the presence of the transponder 12 and confirm the type of detected transponder 12. The decay rate may be expressed as a short-term or long-term average or as both. Historical values of the decay rate may also be used to determine a current threshold level for the decay rate.

Alternate detection parameters are well known to the skilled artisan. For example, the wakeup controller 44*a* may alternatively be programmed to compute average voltage of the progression of response signals as a preferred detection parameter. Alternatively, or in addition, the wakeup controller 44*a* may be programmed to compute an amount of detection signal energy absorbed by the surrounding environment based on an evaluation of the progression of analog response signals (i.e., the OP_AMP input signals) as a preferred detection parameter.

Once the wakeup controller 44*a* determines the presence and type of the transponder 12 using one or more detection parameters, the wakeup controller 44*a* forwards a TAGREC (transponder recognized) output signal to the main controller 24 (shown in FIG. 1) via the TAGREC output 54. When the TAGREC output signal has been sent, the wakeup unit 26*a* assumes an excitation signal will be generated and transmitted by the ER circuit 22 (shown in FIG. 1) and the reader antenna assembly 20. Assertion of the DETCLR output signal to the base of the second transistor 108 via the DETCLR output 60 at this time or at any other time as desired effectively clears the wakeup unit 26*a*. The first and second diodes 102, 104 protect the power supply rail from pumping in the event the voltage of excitation signals is greater than the supply voltage.

Operation of the wakeup controller 44, timer 46 and ADC 48 as described above is preferably enabled by the DSP algorithm stored in the wakeup controller 44. It is alternately within the scope of the present invention to store the DSP algorithm in the main controller 24 of the associated reader 14, thereby eliminating the wakeup controller 44, timer 46 and ADC 48 from the wakeup unit 26. In accordance with this alternate embodiment, the functions of the wakeup controller 44, timer 46 and ADC 48 are performed by the main controller 24 employing the DSP algorithm.

Figure 5:
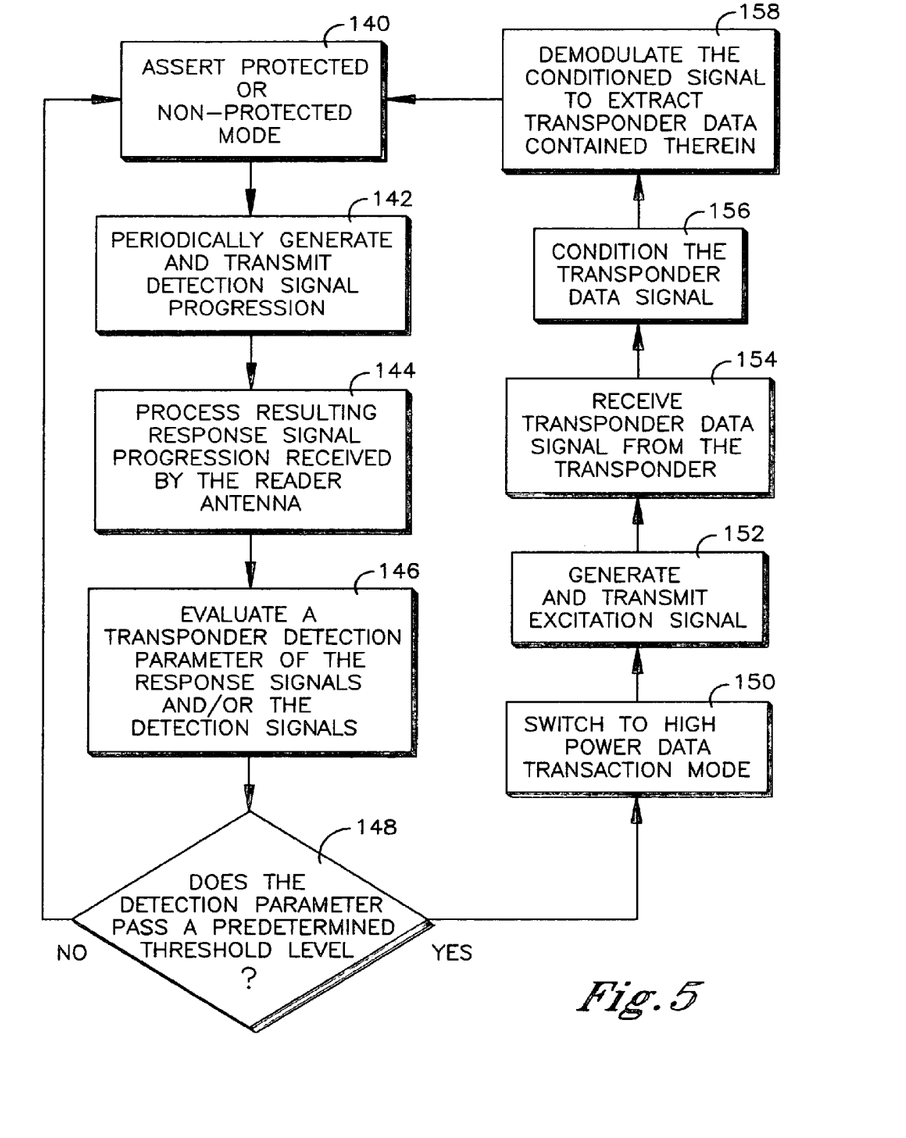
FIG. 5 is a flowchart illustrating a transponder detection method applicable to the wakeup unit of FIG. 1.

A method of performing the detection mode and the associated data transaction mode which employs the reader 14 of FIG. 1 including the wakeup unit 26*a* of FIG. 4 is shown and described below with reference to FIG. 5. The low power detection mode is the default mode of operation for the reader 14. Accordingly, powering up the reader 14 automatically initiates the low power detection mode and the reader 14 continues to operate in the low power detection mode until the wakeup unit 26*a* detects the transponder 12 in the read range of the reader 14. The main controller 24, which manages the power consumption of all reader circuits with the exception of the wakeup unit 26*a*, maintains all managed circuits, and particularly the ER circuit 22, in the low power state until the wakeup unit 26*a* signals the main controller 24 that the transponder 12 has been detected in the read range of the reader 14. Once the transponder 12 is detected, the reader 14 switches to the high power data transaction mode, but automatically switches back to the low power detection mode when the high power data transaction mode is completed.

Block 140 represents the initiation step of the present frequency ranging method for operating the wakeup unit 26*a*, wherein the wakeup unit 26*a* is either in a protected or a non-protected mode. Blocks 142-148 generally describe operation of the wakeup unit 26*a* in the protected or non-protected mode, wherein the wakeup unit 26*a* seeks the transponder 12 in the read range of the reader 14. In block 142 the wakeup unit 26*a* actively seeks the transponder 12 in the surrounding space of the reader 14 while in the low power detection mode. In particular, the detection signal generator circuit 40*a* periodically generates and transmits a serial progression of detection signals at different frequencies into the surrounding space of the reader 14. The serial progression of detection signals comprise at least two detection signals, each generated at a different frequency, and, more preferably comprises 3 or more detection signals, each at a different frequency.

A progression of response signals occurs on the antenna assembly 20*a* as a result of transmitting the progression of detection signals from the antenna assembly 20*a*. The antenna assembly 20*a* conveys the resulting progression of response signals to the response signal receiver circuit 42*a* of the wakeup unit 26. The response signal receiver circuit 42*a* applies a sample and hold technique to the response signals and processes the response signals using the wakeup controller 44*a* as shown in block 144 to determine if the transponder 12 is present in the read range of the reader 14.

Figure 6A:
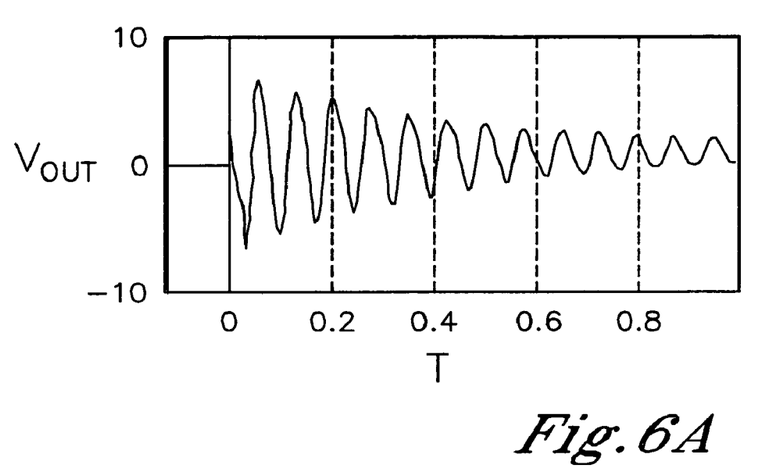
FIG. 6A is a graph showing an example of a detection signal in the form of a sine wave which is decaying at a rate corresponding to the absence of a transponder in the proximal space of the wakeup unit of FIG. 1.
Figure 6B:
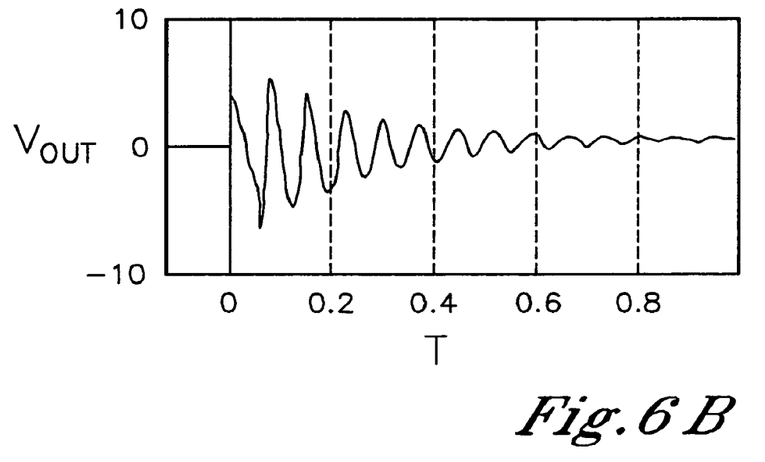
FIG. 6B is a graph showing an example of a detection signal in the form of a sine wave which is decaying at an accelerated rate corresponding to the presence of a transponder in the proximal space of the wakeup unit of FIG. 1.

The detection step shown in block 146 encompasses a number of different techniques for determining whether the transponder 12 is present in the read range. In general, each detection technique used by the response signal receiver circuit 42*a* processes the response signal to evaluate one or more selected transponder detection parameters. For example, if the detection signal is a ring signal in the form of a decaying sine wave and no transponder 12 is present in the read range of the reader 14, the detection signal will have a slow decay rate as shown in FIG. 6A, which is evident in the corresponding response signal. The slow decay rate is attributable to the relatively high Q value of the reader LC circuit. However, when the transponder 12 tuned to essentially the same frequency as the detection signal is brought into the read range of the reader 14, the transponder 12 absorbs a portion of the energy from the detection signal causing the detection signal to decay at a faster rate within the reader LC circuit as shown in FIG. 6B and producing a corresponding faster decaying response signal.

In the present example, the transponder 12 residing in the read range of the reader 14 is detected by evaluating the decay rate of each response signal obtained on the antenna assembly 20*a* relative to a dynamic response threshold level. The response threshold level is termed a dynamic level because the level can vary over time in reaction to operational feedback. In any case, if the decay rate does not reach or pass the dynamic response threshold level (block 148, no), the method returns to block 140 where the wakeup controller 44*a* assumes no transponder 12 is present in the read range of the reader 14 and remains in the low power detection mode. However, if the decay rate reaches or passes the dynamic response threshold level (block 148, yes), the wakeup controller 44*a* assumes the transponder 12 is present in the read range of the reader 14. The wakeup controller 44*a* also determines the type of the transponder 12 by ascertaining the signature of the transponder 12 and correlating the transponder signature with known transponder signatures of existing commercially-available transponders. Upon completion of these tasks, the wakeup controller 44*a* generates and conveys the TAGREC signal to the main controller 24.

Alternatively or additionally, the transponder 12 is detected by evaluating changes in the amount of detection signal energy absorbed by the surrounding environment. In a similar manner as above, if the amount of detection signal energy absorbed by the surrounding environment does not reach or pass the dynamic response threshold level (block 148, no), the method returns to block 140 where the wakeup controller 44*a* assumes no transponder 12 is present in the read range of the reader 14. However, if the amount of detection signal energy absorbed by the surrounding environment reaches or passes the dynamic response threshold level (block 148, yes), the wakeup controller 44*a* assumes the transponder 12 is present which has a transponder frequency corresponding to the detection signal frequency.

The functions of blocks 140-148 are directed by execution of the DSP algorithm within the wakeup controller 44*a*. A more detailed description of the sequential functional steps directed by execution of the DSP algorithm, which fit within the generalized functional template of blocks 140-148 is set forth as follows:

1) wakeup controller 44 is in SLEEP state;
2) timer 46 signals change of wakeup controller 44 to AWAKE state;

3) prior or initial reading of transponder detection parameter is cleared from memory of wakeup controller 44 by asserting DETCLR output signal;
4) DETCLR output signal is de-asserted;
5) SELECTX output signal is asserted then PING output signal is asserted and de-asserted;
6) brief time period expended to permit operational amplifier 110 to slew to a valid analog OP_AMP input signal
7) wakeup controller 44 clock rate is boosted to accelerate processing functions;
8) ADC 48 turned on and instructed to run;
9) brief time period expended for ADC 48 to perform analog to digital conversion of analog OP_AMP input signal;
10) ADC 48 shut off;
11) composite energy due to mutual coupling of the antenna assembly 20 and transponder 12 at a given frequency (e.g. 13.56 MHz) or a near beat frequency of the detection signal is sampled and recorded;
12) rolling sum average for the frequency of the detection signal is maintained, both long-term and short-term;
13) rolling sum average based on a time interval allowing the wakeup unit 26 to adapt to metallic environments (metal reduces sensitivity of the wakeup unit 26, yet is compensated for by wakeup unit 26);
14) if change is seen in the transponder detection parameter greater than the current sensitivity setting of the wakeup unit 26, a detect event has occurred;
15) detect events for a progression of detection signals are correlated and further discriminated to categorically determine the type of the transponder 12 detected;
16) processing rate of wakeup controller 44 reduced to a minimum;
17) transponder detection and type determination reported to main controller 24 by asserting TAGREC output signal (TAGREC output signal is a categorized table of pulses for a progression of detection signals);
18) DONE input signal asserted to signal application is complete;
19) wakeup controller 44 returns to SLEEP state;
20) timer 46 signals change of wakeup controller 44 to AWAKE state.

The period of steps 1-20 above provides a basis for setting the rate that the PING output signals are generated by the wakeup unit 26. Thus, the time interval that the wakeup controller 44 is in the SLEEP state (i.e., the SLEEP time interval) is adjustable.

Blocks 150-158 generally describe operation of the reader 14 in the data transaction mode once the wakeup controller 44a detects the transponder 12 and determines the type of the transponder 12. In particular, block 150 shows switching of the reader 14 from the low power detection mode to the high power data transaction mode. Switching is effectuated by the main controller 24, which transitions various components of the reader 14 including the ER circuit 22 to a high power activated state. When the reader 14 is in the high power data transaction mode, the reader 14 preferably operates in the manner of a conventional contactless reader to communicate with the detected transponder 12. As such, the main controller 24 directs the excitation signal generator circuit 31 to generate an excitation signal as shown in block 152. The excitation signal is transmitted via the reader antenna assembly 20 into the surrounding space of the reader 14 where it is received by the transponder 12 residing in the read range of the reader 14. The excitation signal activates the transponder 12, which generates and transmits a transponder data signal, typically containing data associated with the transponder 12.

The reader 14 receives the transponder data signal as shown in block 154 and proceeds to block 156 where the transponder signal receiver circuit 32 of the reader 14 conditions the transponder data signal. The conditioned signal containing the data of the transponder data signal is conveyed to the main controller 24, which demodulates the conditioned signal to extract the data contained therein, thereby reading the transponder data signal as shown in block 158.

Once all desired data transactions have been completed between the transponder 12 and reader 14 in accordance with blocks 152 through 158, the method returns to block 140 where the non-protected or protected mode is reasserted and the reader 14 awaits detection of another transponder in the read range of the reader 14 by the wakeup unit 26. More specifically, when all desired data transactions are completed, the main controller 24 signals various components of the reader 14 including the ER circuit 22 to transition to the low power detection mode. The main controller 24 may also go to a low power state itself by using the power management application 49 to selectively deactivate various internal functions of the main controller 24. Upon completing the desired data transactions, the main controller 24 forwards a DONE input signal to the wakeup unit 26a which indicates that the main controller 24 has completed its read function.

When a different transponder 13 (shown in FIG. 1) enters the read range of the reader 14, blocks 140-148 are repeated for the transponder 13. The transponder 13 may be a different type or the same type of transponder as the transponder 12. It is further within the scope of the present invention, applying the teaching recited herein, to use the wakeup unit 26a to detect both transponders 12, 13 essentially simultaneously while both transponders 12, 13 are simultaneously present in the read range of the reader 14 and to use the wakeup unit 26a to determine the type of each transponder 12, 13.

The present invention provides an alternate embodiment of the method for operating the wakeup unit 26a in the low power detection mode, wherein the DSP algorithm imposes additional steps for protecting the response signal receiver circuit 42a of FIG. 4 from incoming high voltage antenna signals. The response signal receiver circuit 42a typically includes circuit elements which can be damaged by incoming high voltage antenna signals received from the reader antenna assembly 20a via the antenna output node 92. For example, if the strength of an incoming antenna signal received at the antenna input/output node 92 is high enough, the incoming antenna signal may charge pump the first transistor 106 such that the voltage level at the node connecting the third resistor 98 and noninverting input of the operational amplifier 110 exceeds the supply voltage of the operational amplifier 110.

When the voltage level at the noninverting input of the operational amplifier 110 exceeds its upper voltage tolerance (i.e., an unsafe threshold level), the incoming high voltage antenna signal can damage the operational amplifier 110. Accordingly, the wakeup controller 44a implements a protection function which selectively switches the response signal receiver circuit 42a between the protected mode and the unprotected mode. When the response signal receiver circuit 42a is in the unprotected mode, the response signal receiver circuit 42 receives incoming high voltage antenna signals from the antenna input/output node 92 and conveys them to the wakeup controller 44a via the operational amplifier 110. When the response signal receiver circuit 42a is in the protected mode, the operational amplifier 110 is preferably protected from incoming high voltage antenna signals by clamping the third capacitor 112 or by implementing other protection steps within the purview of the skilled artisan.

The present embodiment of the wakeup unit operating method employs the same sequence of functional steps 1-20 described above which are directed by execution of the DSP algorithm. However, additional steps A-D are inserted after step 10 and before step 11 to effect protection of the response signal receiver circuit 42a if necessary as follows:

A) compare analog to digital conversion of analog OP_AMP input signal to a predetermined unsafe threshold level (typically substantially greater than the dynamic response threshold level)
B) if analog to digital conversion of analog OP_AMP input signal is below unsafe threshold level, proceed to step 11;
C) if analog to digital conversion of analog OP_AMP input signal exceeds unsafe threshold level, assert protected mode and periodically repeat steps 4, 7-10, and 3 until analog to digital conversion of analog OP_AMP input signal is below unsafe threshold level;
D) de-assert protected mode and proceed to step 2.

In summary, steps A-D comprise conveying the analog OP_AMP input signal to the wakeup controller 44a where the ADC 48 converts the analog signal to a digital signal. The wakeup controller 44a determines the amplitude of the digital signal and compares the amplitude value to a predetermined unsafe threshold level. The amplitude of the digital signal preferably represents a measure of radio frequency (RF) energy field strength present at the antenna assembly 20a. If the amplitude of the digital signal is less than the predetermined unsafe threshold level, the response signal receiver circuit 42a remains in the unprotected mode by continuing to de-assert the DETCLR output signal and the wakeup unit 26a performs the transponder detection operations taught herein to actively seek a transponder 12 in the surrounding space of the reader 14.

If the amplitude of the digital signal is greater than the predetermined unsafe threshold level, the response signal receiver circuit 42a switches to the protected mode by continuously asserting the DETCLR output signal to the base of the second transistor 108 which clamps one of the inputs (e.g., noninverting input) of the operational amplifier 110. The wakeup controller 44a also preferably sends a signal to the main controller 24 indicating a high RF energy field strength at the antenna assembly 20a. The main controller 24 preferably performs operations to protect sensitive components contained within the ER circuit 22 from incoming high voltage antenna signals in response to the high RF energy field strength signal from the wakeup controller 44a.

Once in the protected mode, the response signal receiver circuit 42a preferably remains in the protected mode for a specified (i.e., predetermined) or unspecified protected time period. Upon expiration of the protected time period, the wakeup controller 44 briefly de-asserts the DETCLR output signal which enables another determination of the amplitude of the digital OP_AMP output signal. If the amplitude of the digital OP_AMP output signal is still above the predetermined unsafe threshold level, the response signal receiver circuit 42a remains in the protected mode. The protected time period can also be adjusted as a function of the newly determined value of the amplitude of the digital OP_AMP output signal. However, if the amplitude of the digital signal is less than the predetermined unsafe threshold level, the wakeup controller 44a reinitiates the detection mode.

While the forgoing preferred embodiments of the invention have been described and shown, it is understood that alternatives and modifications, such as those suggested and others, may be made thereto and fall within the scope of the invention. For example, although the detection signal generator circuit and the response signal receiver circuit are shown and described above as being separate from the ER circuit, it is within the purview of the skilled artisan to partially or entirely incorporate the detection signal generator and receiver circuits into the ER circuit. There is also the possibility of sharing certain specified components between the circuits. It is further within the purview of the skilled artisan to alternately integrate some or all of the functions and/or structure of the detection circuit controller into the main controller or vice versa. Such alternatives and modifications are within the scope and contemplation of the present invention.

I claim:

1. A transponder detector comprising:
an antenna assembly;
a first circuit coupled to said antenna assembly, said first circuit configured to generate and transmit one or more detection signals via said antenna assembly, wherein the first circuit comprises an inverter which shapes the one or more detection signals to a selected width and amplitude;
a second circuit coupled to said antenna assembly, said second circuit configured to receive one or more response signals from said antenna assembly resulting from transmission of said one or more detection signals, wherein said one or more response signals have a transponder parameter; and
a controller configured to detect the presence of a transponder having a transponder frequency in a proximal space of said transponder detector based on said transponder parameter of one or more said response signals, wherein the inverter connects a series resistance to a parallel capacitance, the series resistance including a switched resistor controlled by a resistance switch, and the parallel capacitance including a switch capacitor controlled by a capacitor switch, and wherein said controller is further configured to evaluate a power value of each of said one or more response signals based on said transponder parameter and compare each of said power values of each of said one or more response signals against a safety threshold value.

2. The transponder detector of claim 1, wherein said one or more response signals are analog signals and said controller includes an analog to digital converter configured to convert each of said one or more analog signals to one or more digital signals and to process each of said digital signals to determine a power value of each of said one or more response signals.

3. The transponder detector of claim 1, wherein said controller is further configured to set said second circuit to a protect mode upon any of said power values of any of said one or more response signals reaching or exceeding said safety threshold value.

4. The transponder detector of claim 1, wherein said controller is further configured to set said second circuit to an unprotect mode upon all of said power values of said one or more response signals falling below said safety threshold value.

5. The transponder detector of claim 1, wherein said safety threshold value is selectable.

6. A frequency ranging method for transponder detection comprising:
transmitting one or more detection signals via an antenna assembly that is connected to a circuit which includes an inverter which shapes the one or more detection signals to a selected width and amplitude, wherein the inverter connects a series resistance to a parallel capacitance, the series resistance including a switched resistor controlled by a resistance switch, and the parallel capacitance including a switch capacitor controlled by a capacitor switch;

receiving one or more response signals from said antenna assembly resulting from transmission of said one or more detection signals, wherein said one or more response signals have a transponder parameter, wherein said wakeup controller is further configured to evaluate a power value of each of said one or more response signals based on said transponder parameter and compare each of said power values of each of said one or more response signals against a safety threshold value; and detecting a transponder having a transponder frequency in a proximal space of said antenna assembly based on a change in value of said transponder parameter for said one or more response signals.

7. The method of claim 6, further comprising evaluating a power value of each of said one or more response signals based on said transponder parameter and comparing each of said power values of each of said one or more response signals against a safety threshold value.

8. The method of claim 6, wherein said one or more response signals are analog signals, said method further comprising converting said one or more analog signals to one or more digital signals to determine said power value of each of said one or more response signals.

9. The method of claim 7, further comprising setting said second circuit to a protect mode upon any of said power values of any of said one or more response signals reaching or exceeding said safety threshold value.

10. The method of claim 7, further comprising setting said second circuit to an unprotect mode upon all of said power values of said one or more response signals falling below said safety threshold value.

11. The method of claim 7, wherein said safety threshold value is selectable.

12. A reader for an RFID system comprising:
a reader antenna assembly;
an excitation signal generator circuit coupled to said reader antenna assembly;
a transponder signal receiver circuit coupled to said reader antenna assembly;
a main controller coupled to said excitation signal generator circuit and said transponder signal receiver circuit;
a wakeup unit coupled between said reader antenna assembly and said main controller, said wakeup unit configured with a detection signal generator circuit, a response signal receiver circuit, and a wakeup controller;
said detection signal generator circuit further configured to generate and transmit one or more detection signals, the detection signal generator circuit including an inverter that shapes the one or more detection signals to a selected width and amplitude; and
said response signal receiver circuit further configured to receive one or more response signals resulting from transmission of said detection signals from said detection signal generator circuit, wherein said response signals have a transponder parameter,
said wakeup controller further configured to determine a power value from each of said one or more response signals, wherein the inverter connects a series resistance to a parallel capacitance, the series resistance including a switched resistor controlled by a resistance switch, and the parallel capacitance including a switch capacitor controlled by a capacitor switch, and wherein said wakeup controller is further configured to evaluate a power value of each of said one or more response signals based on said transponder parameter and compare each of said power values of each of said one or more response signals against a safety threshold value.

13. The reader of claim 12, wherein said one or more response signals are analog signals and said main controller includes an analog to digital converter configured to convert each of said one or more analog signals to a digital signal and to process each of said digital signals to determine a power value of each of said one or more response signals.

14. The wakeup controller of claim 12, wherein said wakeup controller is further configured to set said response signal receiver circuit to a protect mode upon said value of said transponder parameter reaching or exceeding said safety threshold value.

15. The wakeup controller of claim 12, wherein said wakeup controller is further configured to set said response signal receiver circuit to an unprotect mode upon said value of said transponder parameter reaching below said safety threshold value.

16. The wakeup controller of claim 12, wherein said safety threshold value is selectable.

* * * * *